2,798,884
Patented July 9, 1957

2,798,884
PRODUCTION OF ACRYLONITRILE

George L. Christopher, New Canaan, and Erwin L. Carpenter, Stamford, Conn., and Marshall L. Spector, Ballston Lake, N. Y., assignors to American Cyanamid Company, New York, N. Y., a corporation of Maine No Drawing. Application December 19, 1955,
Serial No. 553,693

4 Claims. (Cl. 260—465.3)

This invention relates to the preparation of acrylonitrile. More particularly, it relates to an improved method for the preparation of acrylonitrile by the liquid phase catalytic reaction of HCN and acetylene.

Acrylonitrile is presently one of the more promising of chemical intermediates. It has already proved to be of particular value in the manufacture of a wide range of products, e. g., plastics, synthetic rubbers, synthetic fibers, soil conditioners and the like. Because of the importance of acrylonitrile, great interest exists in methods of its preparation.

One method comprises a liquid phase catalytic reaction of HCN and acetylene. Various catalysts have been suggested for carrying out this reaction. In general, however, the best catalyst is cuprous chloride. This is prepared as an aqueous solution containing, in addition, hydrochloric acid and an alkali metal or ammonium chloride as a solubilizer for the cuprous chloride. To the catalyst solution maintained at a pH of about 0.0–1.5 and a temperature which may range as high as 110° C., are fed HCN and acetylene. The resultant acrylonitrile-bearing reaction gas, containing various impurities, is usually absorbed in an aqueous medium which is then treated to obtain a purified acrylonitrile product.

One of the problems encountered when conducting the above-described reaction in water is that numerous by-products are formed. One of the more bothersome of these is acetaldehyde, for which the standard of purity in commercial acrylonitrile is quite rigid. While this standard may be met by purifying the crude acrylonitrile, procedures employed for this purpose are for the most part complex and costly. The defficulty in reducing the acetaldehyde content, moreover, is aggravated by the fact that lactonitrile, another by-product obtained in aqueous medium, dissociates into acetaldehyde and HCN.

In order to avoid the problems created by the formation of by-product acetaldehyde, it has been proposed to conduct the reaction using a cuprous chloride catalyst in an anhydrous medium. In this way, the formation of acetaldehyde is eliminated completely. The organic solvents heretofore employed have been straight chain amides of carboxylic acids, notably acetamide and formamide. While the use of such solvents overcomes the problems created by the presence of acetaldehyde as in an aqueous medium, yet they are not altogether satisfactory. The most outstanding shortcoming of such solvents is that the catalyst activity decreases with time. Thus it is necessary in a short period of time to replace the catalyst solution.

There has remained, therefore, a need for an improved process for producing acrylonitrile by the catalytic reaction of HCN and acetylene whereby the formation of acetaldehyde is eliminated or at least minimized. It is an object of this invention to fulfill this need. It is a further object of this invention to fulfill this need without at the same time adversely affecting the activity of the catalyst.

It has now been surprisingly discovered that these objects may be effectively met by conducting the reaction of acetylene and HCN in the presence of a cuprous chloride catalyst dissolved in an anhydrous lactam-type solvent. Particularly, in accordance with this invention, the solvent in which the cuprous chloride catalyst is dissolved is selected from the group consisting of pyrrolidone, piperidone, caprolactam, and the N-methyl and N-ethyl derivatives thereof.

By conducting the reaction in an anhydrous organic solvent, the formation of by-product acetaldehyde is eliminated. What is most surprising, however, is that the life of the cuprous chloride catalyst is not impaired by the cyclic amides of this invention as when using the prior art straight chain amides. Why the particular solvents employed herein do not influence the stability of the catalyst activity is not understood. Apparently, however, by-products are formed when using a straight chain amide as solvent which affect the catalyst and which do not form when using a cyclic amide according to this invention. However, there is no desire to limit the process of this invention by any particular theory of operation.

It is still a further advantage of this invention that the divinyl acetylene content of the final acrylonitrile product may be readily brought within requirements presently established for certain commercial uses of acrylonitrile. When operating with an aqueous cuprous chloride solution, it is necessary to raise the HCN partial pressure over the catalyst solution from 3 mm. to 20–30 mm. to reduce the divinyl acetylene content from 50 p. p. m. to 5 p. p. m. The same effect may be obtained when conducting the reaction in the presence of a cuprous chloride catalyst according to this invention by merely increasing the HCN partial pressure from 0.3 mm. to 3.0 mm.

The cuprous chloride catalyst according to this invention is dissolved in the selected organic solvent using ammonium chloride preferably in amount no more than that necessary to obtain complete dissolution. The ammonium chloride, of course, may be replaced by any of the alkali metal chlorides which function similarly. To the resultant mixture are then fed acetylene and HCN at a temperature ranging from about 60° C. to the boiling point of the catalyst. The reaction gas may then be absorbed in an aqeous medium and the resultant aqueous acrylonitrile solution further purified by means which form no part of this invention.

The following examples illustrate the process of this invention. These examples are intended to be illustrative only and not by way of limitation.

EXAMPLE 1

Catalyst solutions were prepared comprising 5 mols of cuprous chloride, 3 mols of ammonium chloride, 1 mol of cuprous cyanide and enough solvent to make one liter of solution at 90° C. Acetylene is then fed at a rate of 7 mols/hr. and HCN at a rate such that the HCN partial pressure above the catalyst solution is maintained at 0.5–1.0 mm. Hg. Results appear in Table I.

Table I

| Solvent | Yield of Acrylonitrile (grams/liter/hour) | | | | By-Product Organic Acids |
|---|---|---|---|---|---|
| | Initial | 12 hrs. | 24 hrs. | 50 hrs. | |
| Acetamide | 43 | 30 | 22 | | 0.3 mols of acetic acid. |
| Formamide | 37 | 12 | | | 0.5 mols of formic acid. |
| Pyrrolidone | 37 | 33 | 30 | 25 | None. |

The results of Table I clearly show the superior results obtained using a lactam-type solvent according to this invention. Using pyrrolidone, the activity of the catalyst decreases less than 1/3 in 50 hours. Moreover, during an additional 50 hours of operation, the catalyst activity remains substantially constant. In contrast, the catalyst activities under the same conditions when using acetamide and formamide as solvents decrease, respectively, more than 1/2 in 24 hours and more than 2/3 in 12 hours. The space-time yield in the case of acetamide is less in 24 hours than it is with pyrrolidone in 50 hours. In the case of formamide, the space-time yield in 12 hours is less than 1/2 as great as with pyrrolidone in 50 hours. In addition, by-product organic acids appear when using acetamide and formamide, whereas with pyrrolidone none is found.

EXAMPLE 2

A catalyst solution is prepared using 5 mols of cuprous chloride, 2.5 mols ammonium chloride, 0.5 mol HCl and 1.0 mol cuprous cyanide in sufficient piperidone to make one liter of solution at 90° C. Acetylene and HCN feeds are the same as in Example 1. The initial space-time yield is 39 grams/liter/hour which after 50 hours of operation decreases to 25 grams/liter/hour. Continued operation for an additional 50 hours shows substantially no further decrease. The presence of organic acids is not detected.

EXAMPLE 3

The process of Example 2 is repeated except the piperdone is replaced with sufficient caprolactam to make a liter of catalyst solution. Again the space-time yield of acrylonitrile decreases only about 1/3 in 50 hours of operation staying substantially constant during an additional 50 hours of operation. No by-product organic acids are found.

The use of other lactam-type solvents in accordance with the process of this invention results in a similar constant catalyst activity and high acrylonitrile yields.

We claim:

1. In the preparation of acrylonitrile by the catalytic reaction of HCN and acetylene in the presence of a catalyst comprising cuprous chloride dissolved in a solvent, the improvement in combination therewith for eliminating the formation of acetaldehyde while maintaining a substantially stable catalyst activity and a high yield of acrylonitrile which comprises: conducting the reaction in an anhydrous cuprous chloride catalyst solution comprising a solvent selected from the group consisting of 2-pyrrolidone, 2-piperidone, caprolactam, and the N-methyl and N-ethyl derivatives thereof.

2. A process according to claim 1 in which the solvent is 2-pyrrolidone.

3. A process according to claim 1 in which the solvent is 2-piperidone.

4. A process according to claim 1 in which the solvent is caprolactam.

References Cited in the file of this patent
UNITED STATES PATENTS

| | | |
|---|---|---|
| 2,698,337 | Heider et al. | Dec. 28, 1954 |
| 2,715,137 | Copelin | Aug. 9, 1955 |